US011948113B2

(12) United States Patent
Argyros et al.

(10) Patent No.: US 11,948,113 B2
(45) Date of Patent: Apr. 2, 2024

(54) GENERATING RISK ASSESSMENT SOFTWARE

(71) Applicant: International Business Machines Corporation, Armonk, NY (US)

(72) Inventors: Kelly A Argyros, Fairfax, VA (US); Donna K Byron, Petersham, MA (US); Lakshminarayanan Krishnamurthy, Round Rock, TX (US); Joan W Tomlinson, Alexandria, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1296 days.

(21) Appl. No.: 15/820,989

(22) Filed: Nov. 22, 2017

(65) Prior Publication Data

US 2019/0156256 A1    May 23, 2019

(51) Int. Cl.
*G06Q 10/00*       (2023.01)
*G06F 40/216*      (2020.01)
*G06F 40/30*       (2020.01)
*G06Q 10/0635*     (2023.01)
*G06F 40/205*      (2020.01)
*G06F 40/284*      (2020.01)

(52) U.S. Cl.
CPC ....... *G06Q 10/0635* (2013.01); *G06F 40/216* (2020.01); *G06F 40/30* (2020.01); *G06F 40/205* (2020.01); *G06F 40/284* (2020.01)

(58) Field of Classification Search
None
See application file for complete search history.

(56) References Cited

U.S. PATENT DOCUMENTS

| 8,515,783 | B1 | 8/2013 | Weeks | |
| 10,510,050 | B2 * | 12/2019 | Meushar | G06Q 10/109 |
| 11,055,637 | B2 * | 7/2021 | Hokari | G01C 21/3673 |
| 2008/0249793 | A1 | 10/2008 | Angell et al. | |
| 2011/0010343 | A1 * | 1/2011 | Chavda | G06F 16/245 707/637 |
| 2011/0067005 | A1 * | 3/2011 | Bassin | G06F 8/10 717/127 |
| 2012/0191661 | A1 * | 7/2012 | Chavda | G06F 16/245 707/661 |
| 2012/0192159 | A1 * | 7/2012 | Holden | G06F 11/3676 717/127 |
| 2013/0132275 | A1 | 5/2013 | Enzaldo et al. | |

(Continued)

OTHER PUBLICATIONS

Enterprise Risk Management Software, Dec. 17, 2015, Quantivate, https://quantivate.com/enterprise-risk-management-software/, p. 1-9. (Year: 2015).*

*Primary Examiner* — Joseph M Waesco (74) *Attorney, Agent, or Firm* — CUENOT, FORSYTHE & KIM, LLC (57) ABSTRACT

One or more portions of a text corpus indicative of operational risk from a set of risk assessment documents is identified. Contextual features from the one or more portions of the text corpus are determined by applying a natural language processing (NLP) algorithm on the one or more portions. Risk identifiers are extracted based on the determined contextual features. A risk assessment software is generated based on the extracted risk identifiers and an operational risk category.

15 Claims, 5 Drawing Sheets

(56) References Cited

U.S. PATENT DOCUMENTS

| | | | |
|---|---|---|---|
| 2013/0332224 A1* | 12/2013 | Haddad | G06Q 10/06 |
| | | | 705/7.26 |
| 2013/0339921 A1* | 12/2013 | Bassin | G06Q 10/0635 |
| | | | 717/101 |
| 2014/0019196 A1* | 1/2014 | Wiggins | G06Q 10/0635 |
| | | | 705/7.28 |
| 2014/0136901 A1* | 5/2014 | Butler | G06F 11/3003 |
| | | | 714/38.1 |
| 2014/0172417 A1* | 6/2014 | Monk, II | G06F 40/30 |
| | | | 704/9 |
| 2014/0344130 A1 | 11/2014 | Lawrence et al. | |
| 2015/0178647 A1* | 6/2015 | Wiggins | G06Q 10/0635 |
| | | | 705/7.28 |
| 2016/0092185 A1* | 3/2016 | Botti | G06Q 10/0635 |
| | | | 717/103 |
| 2016/0162576 A1* | 6/2016 | Ariño de la Rubia | |
| | | | G06F 21/602 |
| | | | 707/739 |
| 2016/0371618 A1* | 12/2016 | Leidner | G06F 16/2246 |
| 2017/0091072 A1* | 3/2017 | Atyam | G06F 11/3672 |

* cited by examiner

GENERATING RISK ASSESSMENT SOFTWARE

TECHNICAL FIELD

The present invention relates generally to a method, system, and computer program product for automatically constructing a software based on historical data. More particularly, the present invention relates to a method, system, and computer program product for generating risk assessment software based on parsed text streams.

BACKGROUND

Risk is a concept that denotes a potential negative impact to an asset or some characteristic of value that may arise from some present process or future event. In everyday usage, "risk" is often used synonymously with the probability of a loss or threat.

Generally, Risk Management is the process of measuring or assessing risk and developing strategies to manage it. Strategies include transferring the risk to another party, avoiding the risk, reducing the negative effect of the risk, and accepting some or all of the consequences of a particular risk. Traditional risk management focuses on risks stemming from physical or legal causes (e.g. natural disasters or fires, accidents, death, and lawsuits). Financial risk management, on the other hand, focuses on risks that can be managed using traded financial instruments.

In ideal risk management, a prioritization process is followed whereby the risks with the greatest loss and the greatest probability of occurring are handled first, and risks with lower probability of occurrence and lower loss are handled later. In practice, the process can be very difficult, and balancing between risks with a high probability of occurrence but lower loss vs. a risk with high loss but lower probability of occurrence can often be mishandled.

SUMMARY OF THE INVENTION

The illustrative embodiments provide a method, system, and computer program product. An aspect of the present invention identifies one or more portions of a text corpus indicative of operational risk from a set of risk assessment documents. The aspect of the present invention determines contextual features from the one or more portions of the text corpus by applying a natural language processing (NLP) algorithm on the one or more portions. The aspect of the present invention extracts risk identifiers based on the determined contextual features. The aspect of the present invention generates a risk assessment software is generated based on the extracted risk identifiers and an operational risk category.

An aspect of the present invention includes a computer program product. The computer program product includes one or more computer-readable storage devices, and program instructions stored on at least one of the one or more storage devices.

An aspect of the present invention includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE EMBODIMENTS

Operational risk can include risks incurred by the internal activities, policies, procedures, and rules of an organization. Operational risk includes the risks arising from the people, systems, and processes through which a company operates. Operational risk can also include legal risk (including fines, penalties, punitive damages resulting from supervisory actions and private settlements) but excludes strategic and reputational risk. Operational risk events may be separated into seven categories: 1) internal fraud; 2) external fraud; 3) employment practices and workplace safety; 4) clients, products, and business practices; 5) damage to physical assets; 6) business disruption and system failures; and 7) execution, delivery & process management. Also, operational risk can include the risk of loss resulting from inadequate or failed internal processes, people, and systems. Illustrative embodiments recognize that banks and other financial institutions may assess their own operational risk in each category and calculate the capital reserve needed to cover any operational risk.

Illustrative embodiments also recognize that organizations typically try to manage operational risk to keep losses within a specific amount that the organization is prepared to accept in pursuit of business or other objectives. While organizations accept that their people, processes, and systems are imperfect, and that losses will arise from errors and ineffective operations, organizations can also utilize technology, such as risk assessment software, to help identify, predict and reduce operational risk.

Further, illustrative embodiments recognize that regulations prescribe various standards for operational risk management for banks and similar financial institutions and give guidance as to how the organizations can develop internal systems to assess operational risk. For example, regulations allow some banks using the Advanced Measurement Approach (AMA) method of capital calculation for operational risk the flexibility to drop below the minimum requirements of capital-to-risk-weighted asset levels if they are able to meet certain requirements set forth by the Basel II regulation.

To facilitate review of the operational and all other types of risk, illustrative embodiments recognize that an organization may use a risk assessment software which may solicit risk information from a business unit about a process subject to a risk and communicate the risk information to a risk management system via a network. Illustrative embodiments recognize that the risk assessment software may determine a risk score associated with the process based on the risk information received from the business unit. The risk assessment software may communicate the risk score to a user that may be responsible for approving a risk management project associated with the process subject to the risk. After the approval has been granted, the risk assessment software may communicate information about an approved risk management project to a second user within the business unit, the risk management project including at least one control designed to mitigate a risk identified by the risk assessment system.

Illustrative embodiments recognize that a system to facilitate a risk assessment process may include a risk assessment software and a risk management system. The risk assessment software may include a computer device configured to assess a risk associated with a business process. The risk management system may be communicatively coupled to the risk assessment system such that the risk management system may be configured to manage a business project for mitigating the risk associated with the business process. In some cases, risk assessment software may provide a user interface having at least one user interface screen, a processor communicatively coupled to the user interface, and a memory device communicatively coupled to the user interface and the processor. The memory device may store instructions, when executed by the processor, cause the risk assessment software to solicit risk information from a business unit about a process subject to a risk via a first user interface screen and communicate the risk information to the risk assessment system via a network. The risk assessment system may determine a risk score associated with the process based on the risk information received from the business unit. In some cases, the risk assessment software may report the risk score to a user via a second user interface screen. The user, via a user interface screen of the risk assessment software, may provide approval of a risk management project for mitigating the risk associated with the process. The instructions may further cause the risk assessment software to communicate, after approval has been granted, information about the risk management project to the risk management system and to solicit, via a user interface screen, a risk management decision about an approved risk management project. The risk management decision may include a choice between closing the risk management project, accepting the risk associated with the project and applying at least one control to the risk management project. In some cases, the at least one control may be designed to mitigate a risk identified by the risk assessment system.

Illustrative embodiments recognize that a risk assessment software may include selecting, via a template screen of a user interface device, one or more parameters for inclusion on one or more user interface templates. In some cases, templates may be used for creating a risk assessment questionnaire for soliciting information about a business process subject to risk. Illustrative embodiments further recognize that a risk assessment software may create, via the user interface device, the risk assessment questionnaire corresponding to the particular business project using the one or more user interface templates.

As such, illustrative embodiments thus recognize that several risk assessment software may provide valuable insights to an organization including the types of obligations the organization needs to be in compliance and the level of risk involved when the organization is conducting its business operations in a certain market. Indeed, the increasing number of regulations spanning across several operational risk categories underscores the importance of risk assessment software. Illustrative embodiments, however, recognize that the risk assessments are typically determined independent of previous assessment performed for the same/different organizations, even when risk assessment software are available. In particular, an organization is required to complete a questionnaire each time with voluminous checklists manually which leads to inefficiency, subjective judgments, and human errors.

Illustrative embodiments recognize that an organization may incorporate previous risk assessments to create a new risk assessment template and/or a configuration for a risk assessment software. To perform this function, an organization needs to manually inspect previous risk assessments to generate new risk assessment reports and/or to design their own risk assessment software. Illustrative embodiments thus recognize that the current solutions require a large commitment of resources to be accurate and comprehensive, yet they still will be subject to human errors.

The illustrative embodiments recognize that the presently available tools or solutions do not address the needs or provide adequate solutions for these needs. The illustrative embodiments used to describe the invention generally address and solve the above-described problems and other problems related to configuring a risk assessment software.

An embodiment can be implemented as a software application. The application implementing an embodiment can be configured as a modification of an existing software platform, as a separate application that operates in conjunction with an existing software platform, a standalone application, or some combinations thereof.

An embodiment receives previous risk assessment reports associated with an operational risk category. In some cases, the embodiment constructs a database query to retrieve the previous records of risk assessment reports. The previous records of risk assessment reports may have been generated by an organization for which a risk assessment software will be designed and configured, and/or by third party organizations that are involved in similar business operations as the organization for which the risk assessment software is to be designed and configured.

An embodiment performs a natural language processing (NLP) algorithm to extract risk identifiers from the previous risk assessment reports. In other words, NLP algorithms may transform natural language statements contained in previous risk assessment reports into structured facts. For example, a computer may parse a body of text, sometimes referred to as a 'corpus' or 'text corpus', and use NLP algorithms to extract risk identifiers from this corpus. The extracted risk identifiers may be stored in a fact database, which may then be utilized to configure risk assessment software for an organization.

In several embodiments, risk identifiers may be text tokens indicative of a regulation, an obligation, a topic, a subject, or a subject-matter domain, that is to be used for evaluating factors that are relevant to configuring or otherwise generating a risk assessment software. For example, the embodiment receives the context information by receiving an ontology, a taxonomy, or a lexicon of context-specific terms, phrases, or information that relate to an operational risk. Then the embodiment identifies a set of one or more portions in the previous risk assessment reports that relate or correspond to the provided context information. The embodiment parses the text of the identified set of portions so that one or more risk identifiers can be constructed.

In one example, a sentence in a portion is parsed to identify the {subject, predicate, object} triple from which the risk identifier can be extracted or constructed. In another example, a group of words in one or more portions in the previous risk assessment reports are lemmatized to identify one or more terms to use as a risk identifier. In several embodiments, those of ordinary skill in the art will be able to conceive many other ways of parsing the contents of an identified portion of previous risk assessment reports for a similar purpose, and the same are contemplated within the scope of the illustrative embodiments.

Some data sources in the set of data sources provide current information that is relevant to the context in question. The embodiment identifies such data sources, applies the search query or criterion, and finds current contextual information.

The alternative embodiment thus utilizes the contextual search queries and/or criteria constructed from description of the risk information and/or business process to identify a set of risk identifiers that are relevant to the description and extract the risk identifiers to configure a risk assessment software. For example, at any given time, a set of one or more data sources may provide a variety of current information about a variety of contexts. Current information is information that is believed to be up-to-date at the given time.

An embodiment assigns each of the extracted risk identifiers to a corresponding operational risk category. For example, the embodiment may include the following operational risk categories: 1) internal fraud; 2) external fraud; 3) employment practices and workplace safety; 4) clients, products, and business practices; 5) damage to physical assets; 6) business disruption and system failures; and 7) execution, delivery & process management. Based on the content in the risk identifiers, the embodiment assigns each of the extracted risk identifiers to one of the identified operational risk categories. In some embodiments, the assigning of the risk identifiers with operational risk categories may include adding a metadata tag indicative of the operational risk categories. In other embodiments, each operational risk category may include a database reference table into which the extracted risk identifiers can be stored.

An embodiment receives a user request for generating a risk assessment software. In several embodiments, the user request may include an operational risk category. Based on the user selected operational risk category, the embodiment references the operational risk categories stored on a database and assigned to the extracted risk identifiers. In some embodiments, the reference function may include keyword search and retrieving the most relevant result based on the keyword search. In response to the identifying an operational risk category that matches the user selected category, the embodiment retrieves the risk identifiers that are assigned to the identified operational risk category.

An embodiment may configure a risk assessment software based on the retrieved risk identifiers that are assigned to the identified operational risk category. In some embodiments, a risk assessment questionnaire is constructed based on the retrieved risk identifiers. In other embodiments, the risk identifiers are displayed on the risk assessment software via a graphical user interface, so as to allow a user to evaluate the pertinent factors involved in an operational risk assessment for a particular business process. In another embodiment, a new risk assessment software is generated based on the retrieved risk identifiers rather than configuring an existing risk assessment software.

Another embodiment of the present invention utilizes NLP algorithms within the context of Question Answering (QA). In this embodiment, NLP systems provide methods and algorithms that enable computers to derive meaning from a natural language question or statement, in order to translate a natural language 'question' into a 'query' that is suited for interrogating a fact database, or a natural language statement into a fact that is suited for storing in a fact database. In a process that may be referred to as 'query mapping', an embodiment receives a natural language description of the risk information and/or business process from a user in addition to the selection of the operational risk category for which the risk assessment software is to be configured. The embodiment then translates the description with an NLP algorithm to construct a query that is understandable by a computer. The embodiment can thereafter rapidly interrogate a fact database to collect the operational risk categories and risk identifiers relevant to answering the user's description and then configure or otherwise generate the risk assessment software for the user, which the configuration is based on the ingested description. In several embodiments, a search query searches for data that satisfies a condition in the query. A search criterion is a condition that bounds the scope of the search, the information that is searched for such data, or both. A search can use a search query, a search criterion, or both. Within the scope of the disclosure, a circumstance of using a search query or a search criterion can also include a circumstance of using the search query and the search criterion unless otherwise specified.

Often, the translation of the natural language description into a risk identifier query will result in a far more refined search of the risk identifiers in previous risk assessment reports, such that the set of results returned may be more pertinent to the user's natural language description of a business process. In some embodiments, the query mapping process will result in a query that returns only a single, definitive risk identifier from the previous risk assessment reports. The process of query mapping thus reduces the burden of work on the user, at least because they will not have to wade through large volumes of potentially irrelevant information in order to find appropriate information to configure the risk assessment software.

The illustrative embodiments are described with respect to certain types of risk assessment software, NLP systems, risk assessment reports, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
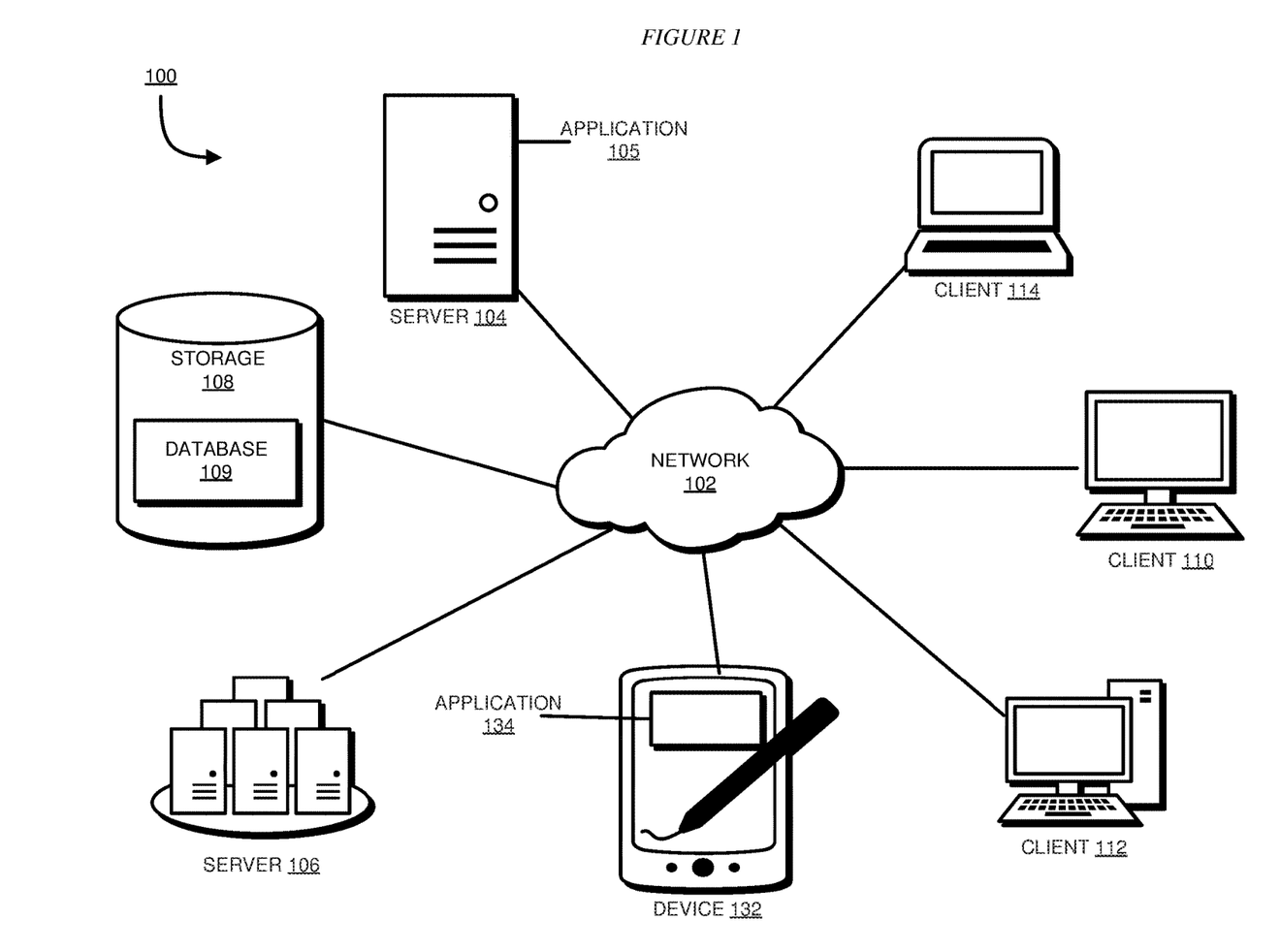
FIG. 1 depicts a block diagram of a network of data processing systems in which illustrative embodiments may be implemented.
Figure 2:
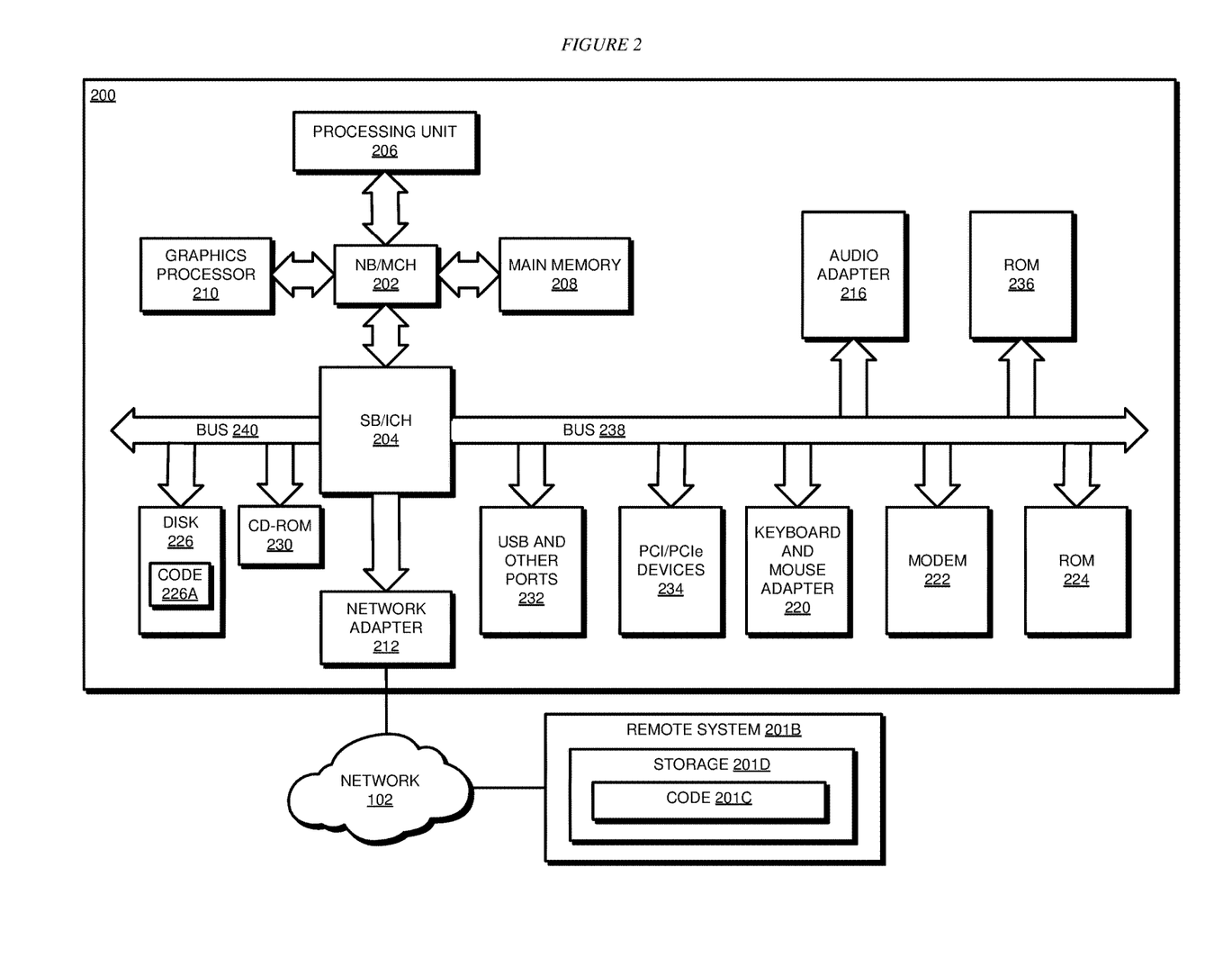
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 alone, application 134 alone, or applications 105 and 134 in combination implement an embodiment described herein. Channel data source 107 provides the past period data of the target channel or other channels in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
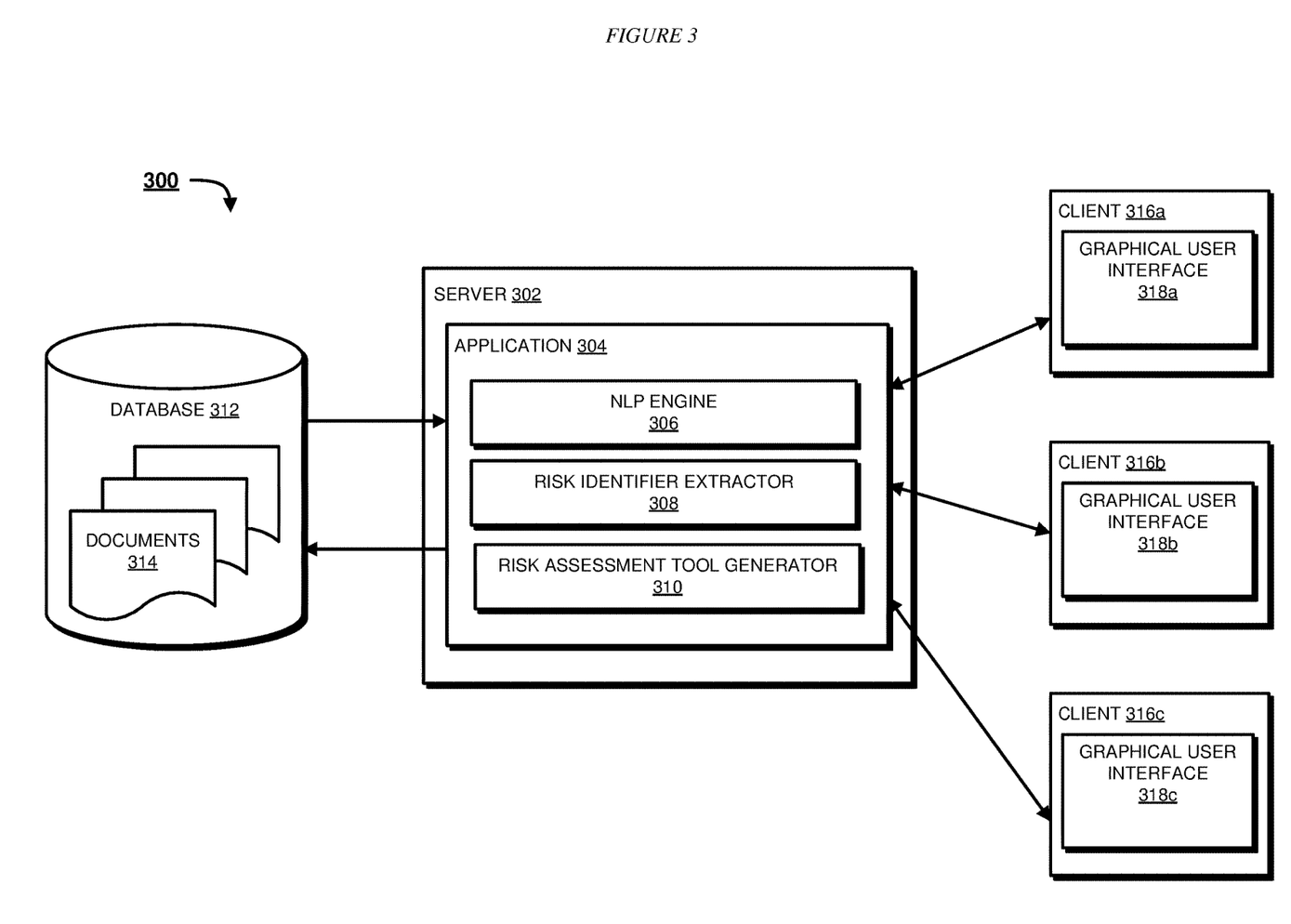
FIG. 3 depicts a block diagram of an example software configuration of generating risk assessment software in accordance with an illustrative embodiment.

With reference to FIG. 3, this figure depicts a block diagram of an example software configuration of generating risk assessment software in accordance with an illustrative embodiment. Application 304 is an example of application 105 in FIG. 1. Clients 316a, 316b, and 316c are examples of clients 110, 112, and 114 in FIG. 1. Server 302 is an example of servers 104 and 106 in FIG. 1.

Database 312 may be implemented through a relational database in which the records are organized into a tabular format, having rows and columns in which the corresponding information can be stored in a "structured" format. Examples of a relational database include SQL and IBM® DB2®. The records stored in a relational database can be retrieved by executing a query constructed through user input.

In other embodiments, database 320 may be a non-relational database such as NoSQL. A NoSQL database environment is a non-relational and largely distributed database system that enables rapid, ad-hoc organization and analysis of extremely high-volume, disparate data types. NoSQL databases are sometimes referred to as cloud databases, non-relational databases, Big Data databases and a myriad of other terms and were developed in response to the sheer volume of data being generated, stored and analyzed by modern users (user-generated data) and their applications (machine-generated data).

In general, NoSQL databases have become the first alternative to relational databases, with scalability, availability, and fault tolerance being key deciding factors. They go well beyond the more widely understood legacy, relational databases (such as Oracle, SQL Server, and DB2 databases) in satisfying the needs of today's modern business applications. A very flexible and schema-less data model, horizontal scalability, distributed architectures, and the use of languages and interfaces that are "not only" SQL typically characterize this technology. Contrary to misconceptions caused by its name, NoSQL does not prohibit structured query language (SQL). While it's true that some NoSQL systems are entirely non-relational, others simply avoid selected relational functionality such as fixed table schemas and join operations. For example, instead of using tables, a NoSQL database might organize data into objects, key/value pairs or tuples.

There are four general types of NoSQL databases, each with their own specific attributes:

Graph database—Based on graph theory, these databases are designed for data whose relations are well represented as a graph and has elements which are interconnected, with an undetermined number of relations between them. Examples include Neo4j and Titan.

Key-Value store—we start with this type of database because these are some of the least complex NoSQL options. These databases are designed for storing data in a schemaless way. In a key-value store, all of the data within consists of an indexed key and a value, hence the name. Examples of this type of database include Cassandra, DyanmoDB, Azure Table Storage (ATS), Riak, BerkeleyDB.

Column store—(also known as wide-column stores) instead of storing data in rows, these databases are designed for storing data tables as sections of columns of data, rather than as rows of data. While this simple description sounds like the inverse of a standard database, wide-column stores offer very high performance and a highly scalable architecture. Examples include HBase, BigTable, and HyperTable.

Document database—expands on the basic idea of key-value stores where "documents" contain more complex in that they contain data and each document is assigned a unique key, which is used to retrieve the document. These are designed for storing, retrieving, and managing document-oriented information, also known as semi-structured data. Examples include MongoDB and CouchDB.

Documents 314 may be a stream of unstructured data represented in a file container, such as Microsoft® Word document file format (e.g., .doc format) or WordPefect® file format (e.g., .wp format). In some embodiments, documents 314 may be a stream of unstructured data represented as an HTML page in which contents can be assigned to a set of HTML tags such as <body>, or script tags such as <script>. In yet other embodiments, documents 314 may be structured data, wherein the content may be formatted into a tabular format including rows and/or columns. In several embodiments, documents 314 may be risk assessment reports, which were previously generated from one or more organizations.

Documents 314 may be retrieved from a database, such as database 312, into which users previously submitted said documents. In other embodiments, documents 314 may be respectively retrieved from different databases or other different sources. For example, a document may be retrieved from an internal database administered by a single organization, whereas another document may be retrieved by a web crawler that scans pertinent documents across public websites and databases. Each of documents 314 may include document schemas which provide an overall metadata structure of such document as well as risk assessment ratings for a plurality of operational risk categories. In some embodiments, the operational risk categories in documents 314 may indicate the categories themselves. In other embodiments, the operational risk categories in documents 314 may indicate a set of business processes that may expose a risk that belongs to such operational risk categories.

In one embodiment, documents 314 may have been generated manually or via a risk assessment software and indicates the extent of risk involved with an entire organization or part of the organization. In one embodiment, the set of categories and values in documents 314 may be limited to those indicative of risk for a subset of activities and/or business processes conducted by the organization or part of the organization.

Documents 314, e.g., risk assessment reports, may be generated through calculating an aggregate of a set of categories and values associated with each of the categories. In some embodiments, the values may be expressed as a character string variable such as "low," "high," or "insufficient." In other embodiments, the values associated with the categories may be expressed as an integer or floating number variable such as "3" or "4.5." In one embodiment, a category in document schemas is a string variable describing the risk category associated with the organization. In several embodiments, operational risk categories in documents 314 may include but are not limited to, legal/regulatory impact, reputational impact, client/customer-related risk, business activity, governance and management oversight, operational controls, and policies and procedures.

Application 302 generally resides in server 302, such as servers 104 and 106 of FIG. 1, and includes NLP engine 306, risk identifiers extractor 308, and risk assessment software generator 310. In this embodiment, NLP engine 306 receives documents 314 from database 312. NLP engine 306 may parse various forms of the text corpus of documents 314 and may output various analysis formats, including part-of-speech tagged text, phrase structure trees, and grammatical relations (typed dependency) format. In some embodiments, NLP engine 306 can be trained through machine learning via a collection of syntactically annotated data such as the Penn Treebank. In one embodiment, NLP engine 306 may utilize lexicalized parsing to tokenize documents 314 then construct a syntax tree structure of text tokens for each of documents 314. In another embodiment, NLP engine 306 may utilize dependency parsing to identifying grammatical relationships between each of the text tokens in each of documents 314.

Risk identifier extractor 308 receives output from NLP engine 306 and generates a set of risk identifiers indicative of risk information associated with an operational risk category. In several embodiments, risk identifier extractor 308 may utilize machine learning algorithms to parse and extract features from documents 314 which are relevant to configuring or otherwise constructing the risk assessment software. In one embodiment, risk identifier extractor 308 may use supervised machine learning algorithm by receiving contextual information of documents 314 vian NLP engine 306. In this embodiment, risk identifier extractor 308 feeds NLP output and contextual information into a plurality of regression functions to obtain a vector of risk identifier outputs.

In another embodiment, risk identifier extractor 308 may use unsupervised machine learning algorithm in which no contextual information about documents 314 is available. In this embodiment, risk identifier extractor 308 runs layers of neural network algorithms to generate feature vectors associated with portions of documents 314, then extracts risk identifiers based on the generated feature vectors. In several embodiments, risk identifier extractor 308 may utilize recursive neural network algorithms to extract risk identifiers from documents 314. In other embodiments, risk identifier extractor 308 may utilize other machine learning algorithms such as Hidden Markov Model (HMM) to extract risk identifiers from documents 314 and cluster the identifiers into each operational risk category.

In one embodiment, risk identifier extractor 308 assigns each of the extracted risk identifiers to one of the identified operational risk categories. In some embodiments, risk identifier extractor 308 may generate a set of metadata tags which are assigned to the risk identifiers that correspond to operational risk categories. In other embodiments, risk identifier extractor 308 may insert extracted risk identifiers into a corresponding database reference table within database 312, which represents an operational risk category that is associated with the extracted risk identifiers.

Risk assessment software generator 310 analyzes the extracted the risk identifiers and selects a set of risk assessment data in order to configure a risk assessment software. In one embodiment, risk assessment software generator 310 may transform the extracted risk identifiers into a database query and executes the database query on a risk assessment software database, to retrieve the set of risk assessment data. In one embodiment, the set of risk assessment data may be used to construct a risk assessment questionnaire, which may become a part of the risk assessment software. In another embodiment, risk assessment software generator 310 may select a set of software structs and/or classes that correspond to the extracted risk identifiers, and generate the risk assessment software based on content stored within the selected set of software structs.

Once the risk assessment software is generated or configured, application 304 may provide the risk assessment software via a telecommunications network, e.g., network 102, to be displayed on graphical user interfaces 318a, 318b, and 318c of clients 316a, 316b, and 316c. The users may utilize the risk assessment software displayed on graphical user interfaces 318a, 318b, and 318c to generate a new set of risk assessment reports that would provide the extent of operational risk that would be exposed to an organization by entering a specific industry, participating in a business process, etc.

Figure 4:
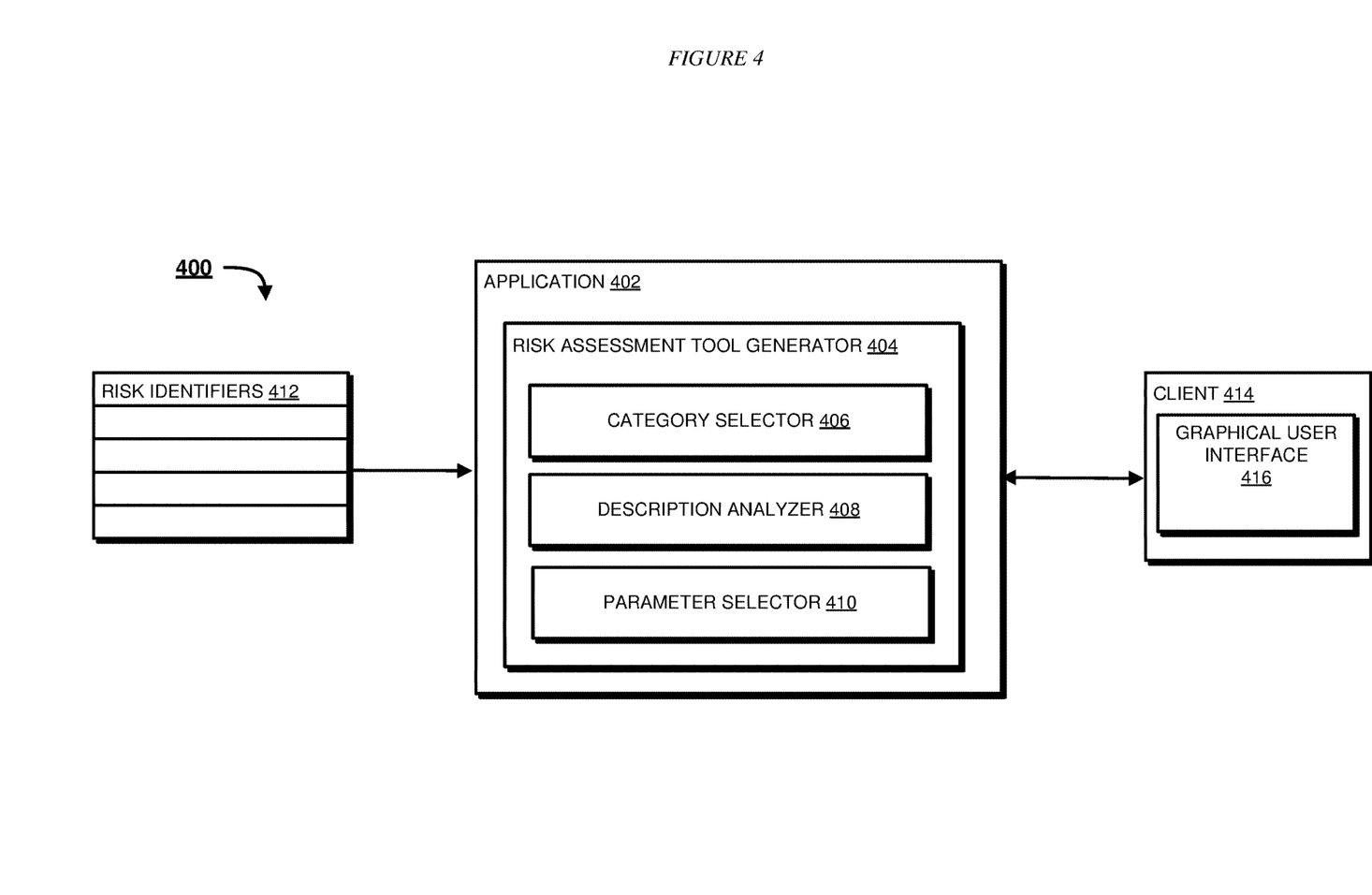
FIG. 4 depicts a block diagram of generating risk assessment software in accordance with an illustrative embodiment.

With reference to FIG. 4, this figure depicts a block diagram of an example generating risk assessment software in accordance with an illustrative embodiment. Application 402 is an example of application 105 in FIG. 1 and application 304 in FIG. 3. Risk assessment software generator 404 is an example of risk assessment generator 310 of FIG. 3. Client 414 is an example of client 316a, 316b, or 316c of FIG. 3 and client 110, 112, or 114 in FIG. 1. Graphical user interface 416 is an example of graphical user interface 318a, 318b, or 318c in FIG. 3. Risk identifiers 412 are examples of risk identifiers extracted by risk identifier extractor 308 in FIG. 3.

Risk assessment generator 404 includes category selector 406, description analyzer 408, and parameter selector 410. Category selector 406 receives an operational risk category which was selected by a user via graphical user interface 418 of client 416. The selected operational risk category indicates a type of an operational risk that would be addressed by the generated risk assessment software. Operational risk categories include, but are not limited to: 1) internal fraud; 2) external fraud; 3) employment practices and workplace safety; 4) clients, products, and business practices; 5) damage to physical assets; 6) business disruption and system failures; and 7) execution, delivery & process management. In several embodiments, those of ordinary skill in the art will be able to conceive many other operational risk categories to be used by category selector 406, to be assigned to risk identifiers 412, and/or for a similar purpose, and the same are contemplated within the scope of the illustrative embodiments.

Description analyzer 408 receives a natural language description of a business process or a particular industry, in which the natural language description was inputted by a user via graphical user interface 416 of client 414. Similar to NLP engine 306 in FIG. 3, description analyzer 408 executes NLP algorithms to extract content that may be compared to risk identifiers 412. In one embodiment, description analyzer 408 may parse various forms of the text corpus of the natural language description and may output various analysis formats, including part-of-speech tagged text, phrase structure trees, and grammatical relations (typed dependency) format. In some embodiments, description analyzer 408 can be trained through machine learning via a collection of syntactically annotated data. In one embodiment, description analyzer 408 may utilize lexicalized parsing to tokenize the natural language description then construct a syntax tree structure of text tokens for the natural language description. In another embodiment, description analyzer 408 may utilize dependency parsing to identifying grammatical relationships between each of the text tokens in the natural language description. Based on the output from the NLP algorithm, description analyzer 408 may generate description features that summarize the natural language description inputted by the user via graphical user interface 416.

Parameter selector 410 receives risk identifiers 412, description features generated by description analyzer 408, and operational risk category selected by category selector 406. In one embodiment, based on the received data, parameter selector 410 selects a set of risk assessment data in order to configure or generate a risk assessment software. In one embodiment, category selector 406 may transform the extracted risk identifiers into a database query and executes the database query on a risk assessment software database, to retrieve the set of risk assessment data corresponding to risk identifiers 412, description features generated by description analyzer 408, and operational risk category selected by category selector 406. In one embodiment, the set of risk assessment data may be used to construct a risk assessment questionnaire, which may become a part of the risk assessment software. In another embodiment, parameter selector 410 may select a set of software structs and/or classes that correspond to the extracted risk identifiers, and generate the risk assessment software based on content stored within the selected set of software structs.

Figure 5:
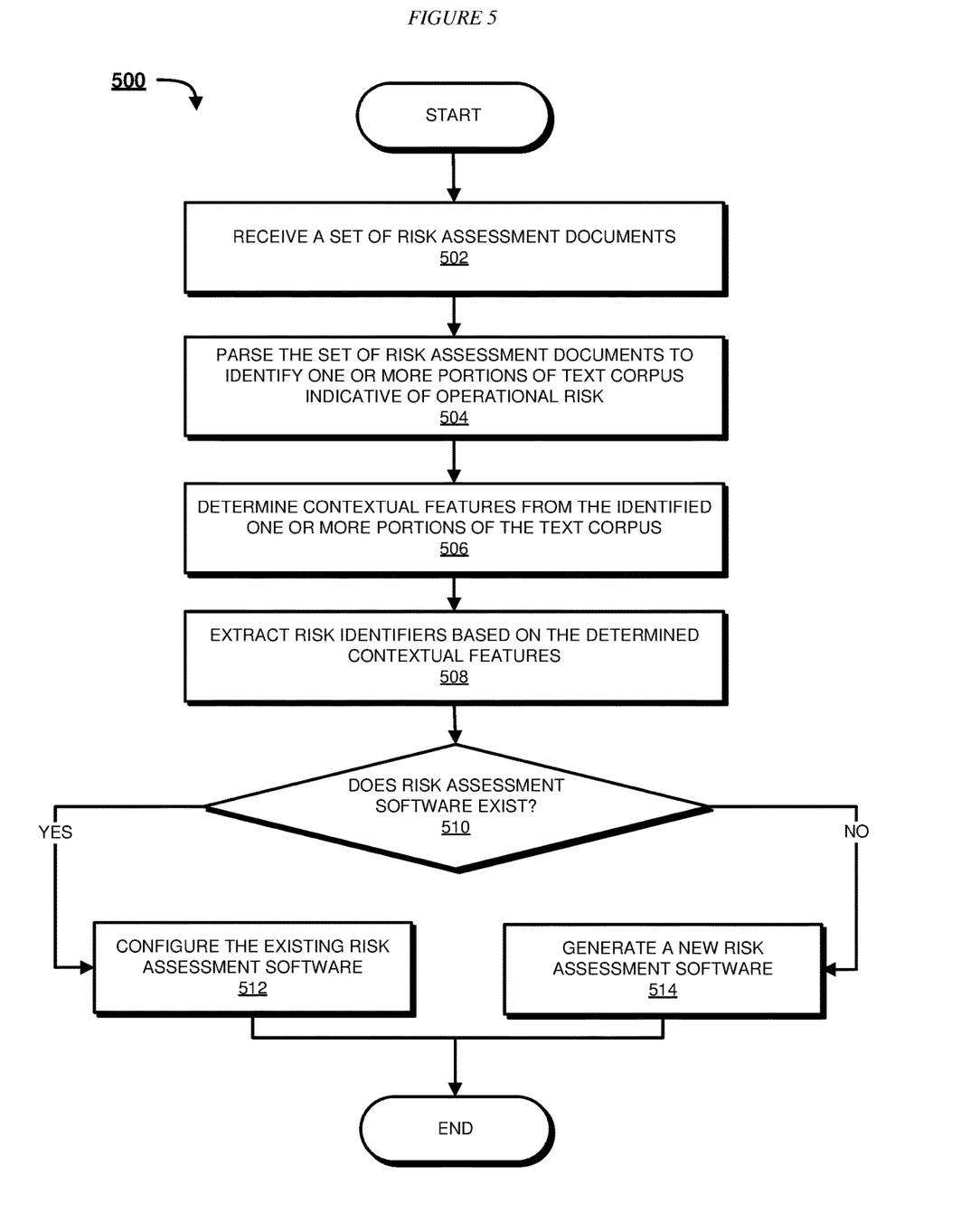
FIG. 5 depicts a flowchart of an example process for generating risk assessment software in accordance with an illustrative embodiment.

With reference to FIG. 5, this figure depicts a flowchart of an example process for generating risk assessment software in accordance with an illustrative embodiment. Process 500 may be implemented in application 304 in FIG. 3 or application 402 in FIG. 4.

The application receives a set of risk assessment documents (block 502). In one embodiment, the set of risk assessment documents may have been previously generated by an organization for which the risk assessment software is to be generated or configured. In other embodiments, the set of risk assessment documents may be documents generated by one or more third party organizations. The application parses the set of risk assessment documents to identify one or more portions of text corpus indicative of operational risk (block 504). In one embodiment, parsing of the set of risk assessment documents may be performed by an NLP algorithm. The application determines contextual features from the identified one or more portions of the text corpus (block 506). In one embodiment, the contextual features may refer to a regulation, an obligation, a topic, a subject, or a subject-matter domain.

The application extracts risk identifiers based on the determined contextual features (block 508). In one embodiment, risk identifiers may be text tokens that capture the content from the determined contextual features. The application determines whether risk assessment software exists (block 510).

If the risk assessment software exists ("Yes" path from block 510), the application configures the existing risk assessment software based on the extracted risk identifiers (block 512). If the risk assessment software does not exist ("No" path from block 510), the application generates a new risk assessment software (block 514). In both embodiments, the application may select only a subset of the extracted risk identifiers based on a business activity information and/or operational risk category submitted by the user through a graphical user interface, e.g., graphical user interface 414 of FIG. 4. Process 500 terminates thereafter.

Thus, a computer implemented method, system or apparatus, and computer program product are provided in the illustrative embodiments for merging two documents that may contain different perspectives and/or bias. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating risk assessment software from a text corpus included within a set of risk assessment documents, comprising:
    identifying one or more portions of a text corpus indicative of operational risk;
    determining, using a natural language processing (NLP) engine, contextual features from the one or more portions of the text corpus;
    generating, using a neural network, feature vectors associated with the one or more portions of the text corpus;
    extracting, using a risk identifier extractor and using the feature vectors, risk identifiers based on the determined contextual features;
    clustering the extracted risk identifiers into a plurality of operational risk categories;
    receiving, from a user and via a graphical user interface, a selection of an operational category from the plurality of operational risk categories;
    selecting, by the risk assessment software generator, a set of software structs that correspond to the extracted risk identifiers; and
    generating a risk assessment software based on content stored within the selected set of the software structs and the selected operational risk category, wherein
    the risk identifiers are text tokens generated by tokenizing the text corpus using the NLP engine.

2. The method according to claim 1, further comprising:
    utilizing the risk assessment software to generate a risk assessment questionnaire based on the extracted risk identifiers and the operational risk category selected by the user; and
    determining a degree of operational risk of an organization based on user responses to the risk assessment questionnaire.

3. The method according to claim 2, wherein
    the degree of the operational risk is further determined by a set of activities performed by the organization.

4. The method according to claim 1, further comprising:
    converting the extracted risk identifiers into a database query; and
    retrieving a set of risk assessment data in response to executing the database query, wherein
    the risk assessment software is generated based on the set of risk assessment data.

5. The method according to claim 1, further comprising:
    determining that the risk assessment software already exists; and
    configuring the existing risk assessment software based on the extracted risk identifiers and the operational risk category selected by the user.

6. A computer program product, comprising:
    one or more computer readable storage medium having stored therein program instructions for generating risk assessment software from a text corpus included within a set of risk assessment documents,
    the program instructions, which when executed by a computer hardware system, cause the computer hardware system to perform:
        identifying one or more portions of a text corpus indicative of operational risk;
        determining, using a natural language processing (NLP) engine, contextual features from the one or more portions of the text corpus;
        generating, using a neural network, feature vectors associated with the one or more portions of the text corpus;
        extracting, using a risk identifier extractor and using the feature vectors, risk identifiers based on the determined contextual features;
        clustering the extracted risk identifiers into a plurality of operational risk categories;
        receiving, from a user and via a graphical user interface, a selection of an operational category from the plurality of operational risk categories;
        selecting, by the risk assessment software generator, a set of software structs that correspond to the extracted risk identifiers; and
        generating a risk assessment software based on content stored within the selected set of the software structs and the selected operational risk category, wherein the risk identifiers are text tokens generated by tokenizing the text corpus using the NLP engine.

7. The computer program product of claim 6, wherein the risk assessment software is utilized to generate a risk assessment questionnaire based on the extracted risk identifiers and the operational risk category selected by the user; and a degree of operational risk of an organization is determined based on user responses to the risk assessment questionnaire.

8. The computer program product of claim 7, wherein the degree of the operational risk is further determined by a set of activities performed by the organization.

9. The computer program product of claim 6, wherein the extracted risk identifiers are converted into a database query;

a set of risk assessment data is retrieved in response to executing the database query, and the risk assessment software is generated based on the set of risk assessment data.

10. The computer program product of claim 6, wherein the risk assessment software is determined to already exist; and the existing risk assessment software is configured based on the extracted risk identifiers and the operational risk category selected by the user.

11. A computer system hardware system for generating risk assessment software from a text corpus included within a set of risk assessment documents, comprising:

one or more hardware processors, and one or more computer readable storage medium having program instructions stored thereon, wherein the program instructions, which when executed by the one or more hardware processors, cause the one or more processors to perform:

identifying one or more portions of a text corpus indicative of operational risk;

determining, using a natural language processing (NLP) engine, contextual features from the one or more portions of the text corpus;

generating, using a neural network, feature vectors associated with the one or more portions of the text corpus;

extracting, using a risk identifier extractor and using the feature vectors, risk identifiers based on the determined contextual features;

clustering the extracted risk identifiers into a plurality of operational risk categories;

receiving, from a user and via a graphical user interface, a selection of an operational category from the plurality of operational risk categories;

selecting, by the risk assessment software generator, a set of software structs that correspond to the extracted risk identifiers; and generating a risk assessment software based on content stored within the selected set of the software structs and the selected operational risk category, wherein the risk identifiers are text tokens generated by tokenizing the text corpus using the NLP engine.

12. The computer hardware system of claim 11, wherein the risk assessment software is utilized to generate a risk assessment questionnaire based on the extracted risk identifiers and the operational risk category selected by the user; and a degree of operational risk of an organization is determined based on user responses to the risk assessment questionnaire.

13. The computer hardware system of claim 12, wherein the degree of the operational risk is further determined by a set of activities performed by the organization.

14. The computer hardware system of claim 11, wherein the extracted risk identifiers are converted into a database query;

a set of risk assessment data is retrieved in response to executing the database query, and the risk assessment software is generated based on the set of risk assessment data.

15. The computer hardware system of claim 11, wherein the risk assessment software is determined to already exist; and the existing risk assessment software is configured based on the extracted risk identifiers and the operational risk category selected by the user.

* * * * *